United States Patent [19]

Hoffer

[11] 3,721,664

[45] March 20, 1973

[54] PREPARATION OF 5-CYTOSINE NUCLEOSIDES

[75] Inventor: Max Hoffer, Nutley, N.J.

[73] Assignee: Hoffman-La Roche Inc., Nutley, N.J.

[22] Filed: Jan. 27, 1970

[21] Appl. No.: 6,289

Related U.S. Application Data

[63] Continuation-in-part of Ser. No. 811,666, March 28, 1969, abandoned.

[52] U.S. Cl............260/211.5 R, 260/256.4, 260/999
[51] Int. Cl.................................................C07c 51/52
[58] Field of Search.....................260/211.5, 211.5 R

[56] References Cited

UNITED STATES PATENTS

| | | |
|---|---|---|
| 3,208,997 | 9/1965 | Iwai et al. ..................260/211.5 R |
| 3,309,359 | 3/1967 | Duschinsky et al............260/211.5 R |
| 3,328,389 | 6/1967 | Shimizu et al. ...............260/211.5 R |
| 3,346,561 | 10/1967 | Boxer et al....................260/211.5 R |
| 3,354,160 | 11/1967 | Duschinsky et al............260/211.5 R |

*Primary Examiner*—Lewis Gotts
*Assistant Examiner*—Johnnie R. Brown
*Attorney*—Samuel L. Welt, Jon S. Saxe, Bernard S. Leon, William H. Epstein and George M. Gould

[57] ABSTRACT

Cytosine nucleosides are prepared by silylating cytosine or a 5-substituted cytosine derivative, condensing the silyl derivative with an acylated sugar halide and saponifying the condensation product. The process is used in preparing known chemotherapeutically useful cytosine nucleosides, particularly the antiviral 5-fluorocytosine arabinoside and 1-β-D-arabino furanosyl-cytosine.

5 Claims, No Drawings

PREPARATION OF 5-CYTOSINE NUCLEOSIDES

CROSS REFERENCE TO RELATED APPLICATION

This application is a continuation in part of Ser. No. 811,666, Hoffer, filed Mar. 28, 1969, now abandoned.

BACKGROUND OF THE INVENTION

The novel process of this invention pertains to an improved synthetic method for the preparation of nucleosides of cytosine with hexose and pentose sugars in which the hemiacetal hydroxyl or the hemiketal hydroxyl is substituted by cytosine or 5-substituted cytosine derivatives.

The synthesis of pyrimidine nucleosides including cytosine nucleosides prepared according to the process of this invention, has been under investigation by numerous workers for several decades. More recently, the pyrimidine nucleosides have attracted special attention as a result of their important physiological and biogenetic properties. Considerable work has been done on the development of synthetic methods for preparing the natural nucleosides, and, these synthetic methods have been adapted to the preparation of a variety of novel nucleosides. An early development in the synthesis of pyrimidine nucleosides was accomplished by Hilbert and Johnson, who prepared an alkyluracil by reaction of 2,4-diethyoxypyrimidine with alkyl halide (J. Am. Chem. Soc., Vol. 52, page 4489, 1930). Subsequent workers introduced various acylhologeno derivatives of hexose and pentose to form a number of pyrimidine hexosides and pentosides (J. Am. Chem. Soc., Vol. 58, page 60, 1936; J. Am. Chem. Soc., Vol. 59, page 330, 1937; and J. Chem. Soc., page 1052, 1947). In an effort to develop similar methods for synthesizing pyrimidine nucleosides, Nishimura and Iwai investigated the reaction of acylhalogeno sugars with trimethylsilyl derivatives of pyrimidine bases (Chem. Pharm. Bull. 12 (3) 57–361). Nishimura and Iwai as well as other investigators (Shen et al. Journ. of Organic Chem., Vol. 30, 835–838) working with different procedures for the preparation of cytosine nucleosides by condensation of a cytosine derivative with a sugar moiety found it necessary, however, to acylate the exocyclic nitrogen in order to avoid condensation at that site and thereby assure obtention of the desired nucleoside. The preparation of cytosine nucleosides by employing a nitrogen protected cytosine derivative in condensations with sugar halides represents the common practice heretofore.

The preparation of cytosine nucleosides has now been successfully achieved without the necessity of protecting the exocyclic nitrogen thereby providing a more facile synthesis of these biologically important products.

Among the cytosine nucleosides, the arabinosyl derivatives have assumed importance as potential chemotherapeutic agents owing to recent observations that $1$-$\beta$-D-arabinofuranosylcytosine was found to have selective anti-viral activity. Other cytosine nucleosides are also known to have interesting chemotherapeutic activities (U.S. Pat. No. 3,002,965).

In particular, $1$-$\beta$-D-arabinofuranosyl-5-fluorocytosine has been found to be an active anti-metabolite inhibiting the growth of virus bacteria and fungi. It is specifically useful against Herpes Simplex and has shown high activity against transplanted mouse leukemia P18 and P388. The compound was first described by Fox et al. in the Journal of Medicinal Chem., Vol. 9, pages 101–105 (1966). The compound is prepared from 5-fluoroouracil arabinoside by acetylating, thiating and alkylating to form the 4-methylmercapto derivative which is then converted to the desired $1$-$\beta$-D-arabinofuranosyl-5-fluorocytosine by treatment with liquid ammonia. This synthetic route is particularly troublesome owing to the poor yields and the unpleasant mercapto derivative obtained as an intermediate. The present invention provides a synthetic route to cytosine nucleosides which avoids many of the problems of the heretofore known processes.

BRIEF DESCRIPTION OF THE INVENTION

In its general aspect, this invention pertains to the synthesis of cytosine nucleosides. More particularly, the invention pertains to a novel synthetic approach to the synthesis of cytosine nucleosides utilizing as starting material silyloxy derivatives of cytosine. The silyoxy derivatives are condensed with protected sugar groups to give crystalline nucleoside derivatives which are readily separated into their $\alpha$ and $\beta$ anomers by fractional crystallization. Hence, this process provides for the first time a method for the direct synthesizing $1$-$\beta$-D-arabinofuranosyl-5-cytosine by direct condensation of an arabinose derivative with a cytosine.

DETAILED DESCRIPTION OF THE INVENTION

In one of the more specific aspects, this invention pertains to the synthesis of chemotherapeutically active cytosine nucleosides, in particular, the $\beta$ anomer of cytosine nucleosides and more particularly the $\beta$ anomer of 5-fluorocytosine nucleosides. The process of this invention involves the surprising discovery that on silylating cytosine and its 5-substituted derivatives, there can be obtained the silyl derivatives of the formula:

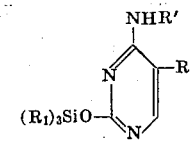

wherein R is hydrogen, or fluoro; $R_1$ is lower alkyl; and $R'$ when R is hydrogen is $-Si(R_3)$ and when R is fluoro is hydrogen.

Among the novel compounds of formula I are compounds of mono silyl derivatives of the formula:

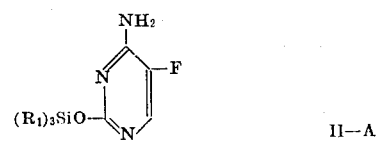

wherein $R_1$ is as above.

The silyl-cytosine derivatives of formula II can be readily condensed with protected halogeno sugar derivatives to form the corresponding nucleoside without the steps ordinarily involved in protecting the heterocyclic nitrogen, for example by acylating and deacylating. The nucleoside condensation product is obtained in high yields as a mixture of the $\alpha$ and $\beta$ anomers in crystalline form. The mixture of crystalline anomers is readily susceptible to separation. The process thus provides a facile route for preparing biologically useful nucleosides and in particular, it provides an improved synthesis for the chemotherapeutically active 1-β-D-arabinofuranosyl-5-fluorocytosine and 1-β-D-arabinofuranosyl-5-cytosine.

The process of this invention can be traced with respect to the reaction sequence outlined schematically below:

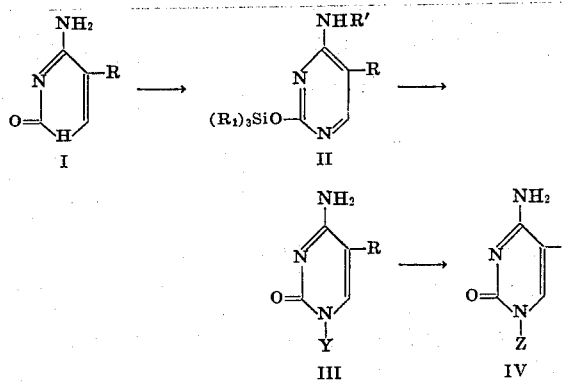

where R, $R_1$, R' are as above; Y represents an acylated hexose or pentose group and Z represents a hexose or pentose group.

The silyloxy cytosine intermediates of formula II above can be prepared by treating cytosine derivatives of formula I with a silylating agent such as hexamethyldisilazane, trimethylfluorosylanetriethylamine and the like. Preparation of formula II derivatives is preferably carried out at an elevated temperature in the presence of an inert organic solvent. Suitable temperatures are for example, temperatures between about room temperature and about 150°C. As solvent there can be employed any of the ordinary inert organic solvents such as for example, the hydrocarbons, e. g., benzene, toluene and the like, and ethers, e.g., dioxane, tetrahydrofuran, etc. The condensation of the trimethylsilyloxyfluorocytosine of formula II with an acylated halogeno sugar is carried out at an elevated temperature in the absence of solvent. Suitable temperatures for the reaction are temperatures between about 100°C. and about 180°C. If desired, the reaction can be carried out in the presence of an inert organic solvent. The ratio of the reactants is not critical though it is preferred to utilize at least 1 mole of the cytosine derivative per mole of acylhalogeno sugar. The reaction product is obtained as a mixture of the α and β anomers which can be readily separated, for example, by fractional crystallization from a suitable solvent. Suitable solvents are, for example, the lower alkyl ketones especially acetone. The acylated halo sugars which can be employed in the process of the invention includes all of the hexoses and pentoses which can be properly protected by acylation. Sugar derivatives suitable for use in this invention are, for example, the acylated arabinofuranosyl halides, ribofuranosyl halides, deoxyribofuranosyl halides, glucopyranosyl halides, etc.

The acylating group can be any of the ordinary protecting groups such as benzoyl, lower alkyl benzoyl, halo benzoyl, lower alkoxy benzoyl, etc. The sugar halides employed in this invention are preferably the bromide and the chloride. The acylated sugar halides answering the above description are for example:

tri-O-benzoyl-D-arabinofuranosyl bromide,
tri-O-acetyl-D-arabinofuranosyl bromide,
tri-O-benzoyl-D-arabinofuranosyl chloride,
tri-O-aroyl-D-ribofuranosyl chloride,
2-deoxy-diaryl-D-ribofuranosyl chloride, etc.

The compounds of formula III above can be converted to the compounds of formula IV above by any conventional saponification technique such as ester hydrolysis or alcoholysis. Any conventional method of ester hydrolysis or alcoholysis can be utilized to convert the compound of formula III to the compound of formula IV.

The term "lower alkyl" as used herein designates both straight and branched chain lower alkyl groups containing from one to seven carbon atoms such as methyl, ethyl, propyl, etc., with methyl being preferred. The term "halogen" as used herein includes all four halogens, i.e., bromine, chlorine, iodine and fluorine with bromine and chlorine constituting a preferred group with respect to the sugar halide and iodine and fluorine constituting the preferred substituents when R is a halogen. The term "acylated" designates lower alkanoyl, lower aroyl and aryl lower alkanoyl. The preferred aryl group is benzene and substituted benzenes such as lower alkoxy benzene, halo benzene, lower alkyl benzene.

The term "lower alkanoyl" as used throughout the specification includes lower alkanoyl groups containing from one to seven carbon atoms such as formyl, acetyl, propionyl, butyryl and the like. The term "aryl lower alkanoyl" designates aryl lower alkanoyl moieties wherein the aryl and lower alkanoyl portions are defined as above. The term "lower alkoxy" designates lower alkoxy radicals containing from one to seven carbon atoms such as ethoxy, methoxy, propoxy, etc.

The designation of α and β for the anomeric nucleosides obtained according to the process of this invention is in accordance with such designations ordinarily employed in the art.

In a preferred embodiment this invention pertains to the preparation of arabinofuranosyl cytosines according to the following reaction scheme:

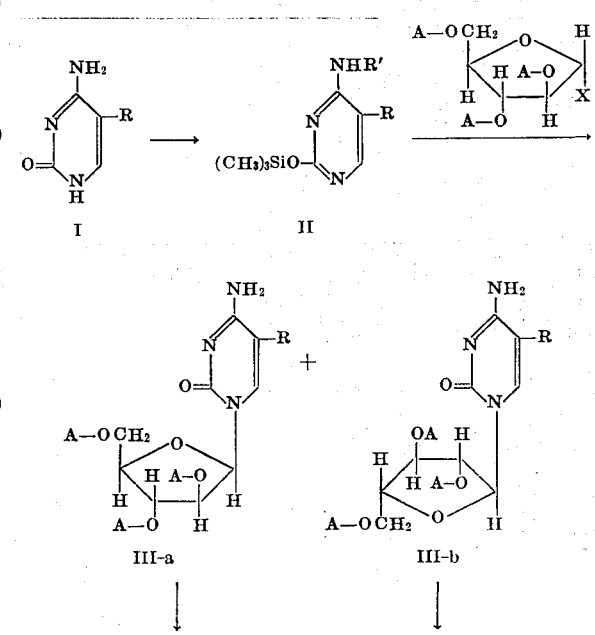

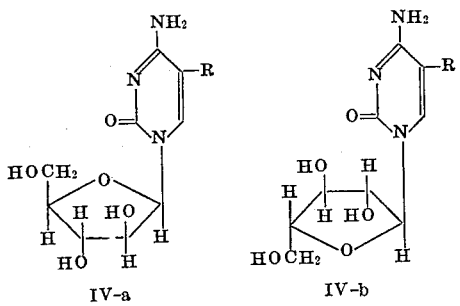

wherein R, and R' are as above, and A represents an acyl protecting group such as lower alkanoyl, e.g., acetyl, propionyl, etc. or aroyl, e. g., benzoyl, p-toluoyl, or aryl lower alkanoyl such as phenacetyl, etc. The cytosine derivative of formula II is conveniently reacted with an acylated halogeno arabinol, e.g., a tribenzoyl arabinofuranosyl chloride or bromide, at a temperature between about 120° and 170°C. utilizing at least 2 moles of the trimethylsilyloxycytosine starting material per mole of acylated halogeno sugar. Separation of the reaction product into its α and β anomers is readily accomplished by fractional crystallization from a mutable solvent such as acetone. The separated anomers are readily saponified by conventional means to obtain the desired cytosine nucleosides.

In a still more preferred embodiment, this invention relates to the preparation of 1-β-D-arabinofuranosyl-5-fluorocytosine by reacting mono-trimethylsilylox-yfluorocytosine with tri-O-benzoyl-α-D-arabinofuranosyl bromide in a molar ration of 2:1 to give a mixture of approximately equal amounts of 1-(2',3',5'-tri-O-benzoyl-β-D-arabinofuranosyl)-5-fluorocytosine and 1-(2',3',5'-tri-O-benzoyl-α-D-arabinofuranosyl)-5-fluorocytosine which are readily separated by virtue of their different solubilities, for example, in acetone and saponified by conventional means such as methanolysis with, for example, barium methylate as a catalyst to give 1-β-D-arabinofuranosyl-5-fluorocytosine and 1-α-D-arabinofuranosyl-5-fluorocytosine respectively.

In accordance with another preferred embodiment of this invention which relates to the preparation of 1-β-D-arabinofuranosyl cytosine, by first reacting 2-(trimethylsiloxy)-4-[(trimethyl-silyl)amine] pyrimidine with tri-O-benzoyl-α-D-arabinofuranosyl bromide in a molar ratio of 1:1 to give a mixture of approximately equal amounts of 1-(2',3',5'-tri-O-benzoyl-β-D-arabinofuranosyl)-cytosine and 1-(2',3',5'-tri-O-benzoyl-α-D-arabinofuranosyl)-cytosine which are readily separated by virtue of the solubilities of hydrohalic acid salts in ethanol-water mixture preferably containing about 66 percent by volume of ethanol. These two isomers can be saponified by conventional means such as methanolysis with, for example, barium methylate as a catalyst to give 1-β-D-arabinofuranosyl-5-cytosine and 1-α-D-arabinofuranosyl-cytosine respectively.

On the other hand, if it is desired to produce the 1-D-arabinofuranosyl-5-cytosine as a mixture of compounds of the formulas IVa and IVb, there is no need to separate the mixture containing the compound of the formula IIIa and IIIb prior to saponification. In this manner the mixture of compounds of the formulas IVa and IVb can be saponified to produce the anomers of the formulas IVa and IVb as a mixture.

The invention will be more readily understood from the specific examples which follow. These examples are intended to further exemplify the specific embodiments of this invention and are not to be construed as limitative of the invention disclosed herein.

EXAMPLE 1

Preparation of tri-O-benzoyl-α-D-arabinofuranosylbromide

D-(−)-arabinose, 200 g. (1.33 mole) was suspended in 4 l. of absolute methanol in a 5-liter three-neck flask equipped with calcium chloride tube and 600 ml. of 2.2N methanolic hydrochloride was added. The mixture was stirred for 4¼ to 4½ hours. 400 ml. of anhydrous pyridine was added and stirring continued for 2 to 3 minutes. Excess methanol was removed by evaporation in vacuo, followed by the addition of 200 ml. of anhydrous pyridine, and repeated evaporation in order to remove all methanol. The residue was dissolved in 1,500 ml. of anhydrous pyridine, and the solution transferred into a 3-liter three-neck flask, equipped with stirrer, cooling bath and dropping funnel. 650 ml. of benzoyl chloride was added dropwise into the stirred solution at 30°-50°. After addition of the benzoyl chloride was complete, the temperature was maintained at 30°-50° for an additional 2 hours. The reaction mixture was poured into 12 l. of water and the amorphous precipitate seeded and allowed to settle overnight. The water was decanted from the now semi-crystalline deposit and the latter was well slurried with 600 ml. of isopropanol. The white crystal mush was filtered by suction and rinsed twice with isopropanol (100 ml. each) and once with ether (200 ml.). The product was dried, first at room temperature, and afterwards in an air current at 50°-60° to give methyl-α-D-tri-O-benzoylarabinofuranoside of melting point 99°-100°.

A 2-liter, three-neck flask equipped with stirrer, gas-conducting tube, thermometer, and calcium chloride tube was charged with 330 g. (0.7 mole) of methyl-α-D-arabinofuranoside, prepared as above, 660 ml. of toluene and 42 g. (0.7 mole) of acetic acid.

80 g. of anhydrous hydrogen bromide was conducted into the stirred mixture at 25°-30°. The crystalline material disappeared within 30-45 minutes furnishing a turbid solution. Stirring was continued for another 45 minutes while hydrogen bromide was conducted in at a considerably reduced rate.

The weight gain of the apparatus amounted finally to 100 g. Stirring was interrupted for 5-10 minutes and the solution decanted from a small amount of a heavy oil, which had settled on the bottom. The latter was rinsed with 100 ml. of toluene and the combined toluene solutions evaporated in vacuo to a light yellowish syrup. Addition of ligroin, boiling point 30°-60°, (petroleum ether) to an insipid turbidity and seeding furnished the tri-O-benzoyl-α-D-arabinofuranosylbromide product in crystalline form. The crystalline product was filtered by suction, rinsed on the filter with 150 ml. of a mixture of toluene and petroleum ether (1:2 by volume) and recrystallized by dissolving it in 500 ml. of toluene at 30°-40° and adding 1 l. of petroleum ether to give free-flowing, off-white crystal powder, melting point 94°-96°.

The isopropanol-ether mother liquor obtained from the precipitated methyl-α-D-tri-O-benzoylarabinofuranoside was evaporated in vacuo to a syrup, the latter dissolved in 1.5 l. of toluene, and the toluene solution washed twice with aqueous sulfuric acid (500 ml. 1N each time) and subsequently twice with saturated aqueous sodium bicarbonate solution (500 ml. each time). After drying over anhydrous sodium sulfate, the solution was evaporated in vacuo, the residual syrup dissolved in 660 ml. of toluene and 42 g. of acetic acid was added. Hydrogen bromide gas (80–100 g.) was conducted in under anhydrous conditions. After 5–12 hours, the solution was evaporated in vacuo, the syrup slurried with petroleum ether, boiling point 30°–60°, and seeded. After allowing to crystallize overnight in a refrigerator, the crystals were collected, slurried with 500 ml. of ether, at 0° and purified by crystallization from toluene-petroleum ether to give tri-O-benzoyl-α-D-arabinofuranosylbromide, melting point 94°–96°.

EXAMPLE 2

Preparation of 4-amino-5-fluoro-2-trimethylsilyloxypyrimidine 174 g. (1.2 mole) of finely powdered and dry fluorocytosine was refluxed under stirring with 475 ml. (368 g., 2.26 mole) of hexamethyldisilazane until after 2 hours, a clear solution had resulted. Refluxing was continued for an additional hour. Upon chilling, the contents of the flask solidified to a crystal mush. Excess hexamethyldisilazane was distilled off completely at 30°–40, 25 mm. into a well-chilled receiver from a hot water bath. Recrystallized from heptane, the 4-amino-5-fluoro-2-trimethylsilyloxypyrimidine product melted at 122°–124°.

EXAMPLE 3

Preparation of 1-(2',3',5'-tribenzoyl-β-D-arabinosyl)-5-fluorocytosine

4-Amino-5-fluoro-2-trimethylsilyloxypyrimidine, prepared as above from 174 g. of fluorocytosine, was heated to 130° under stirring. 324 g.(0.6 mole) of tri-O-benzoyl-α-D-arabinofuranosylbromide was added to the molten material within 5 to 10 minutes at 125°–130°, under stirring. The smelting was kept at 150°–160°, for 15 to 20 minutes (140°–145° for 40 minutes) while volatile Si-compounds were allowed to escape. The volatile compounds were collected by a descending condenser (boiling point 76°–80°). The smelting was then allowed to cool to 60°–80° at which time small amounts of methylene chloride was added gradually to prevent solidification to a glass. More methylene chloride was added as cooling proceeded until a total of 900 ml. was added and the entire reaction mixture was dissolved. 60 ml. of water was then added under good stirring to precipitate fluorocytosine hydrobromide. The latter was filtered by suction and rinsed on the filter twice with 100 ml. of methylene chloride each time. The methylene chloride solution was washed with 500 ml. of 1 percent aqueous ammonia and evaporated to a blistery syrup. The syrup was dissolved in 450 ml. of acetone and the solution seeded. As crystallization was progressing, an additional 900 ml. of acetone was added gradually. Crystallization was allowed to proceed at 20°–25° for 12 to 16 hours. The product was rinsed on the filter with 50 ml. of acetone and dried at 50°–100° to give 1-(2',3',5'-tribenzoyl-β-D-arabinosyl)-5-fluorocytosine, $[\alpha]_D^{26.2}$ +95.97° ($c = 0.07$ percent in $CH_2Cl_2$).

EXAMPLE 4

Preparation of 1-(2',3',5'-tribenzoyl-α-D-arabinosyl)-5-fluorocytosine

The mother liquor obtained from the preparation of the β-anomer as described above was concentrated to one-half its volume and stored at 0° for 24 hours to yield a crystalline mixture of approximately 20 percent of the β-anomer and 80 percent of the α-anomer melting unsharp at 120°–140°, $[\alpha]_D^{26.6}$ −12.22 ($c = 0.07$ in $CH_2Cl_2$), ($\alpha_D$ for pure β-anomer:+95.97, $\alpha_D$ for pure α-anomer: −45.71).

To separate the two anomers, the mixture was boiled with 1 l. of toluene under stirring and 250 ml. of the solvent was distilled off. The material first went into solution but as the toluene distilled off, pure 1-(2',3',5'-α-D-arabinosyl)-5-fluorocytosine crystallized in sandy white aggregates. Recrystallized from a minimum of acetone, the 1-(2',3',5'-tri-O-benzoyl-α-D-arabinosyl)-5-fluorocytosine was obtained as a sandy white crystal powder, melting point 233°; $[\alpha]_D^{26.5}$ −45.71 ($c = 0.965$ in $CH_2Cl_2$).

EXAMPLE 5

Preparation of 1-β-D-arabinofuranosyl-5-fluorocytosine 37.8 g. of tri-O-benzoyl-β-D-arabinofuranosyl-5-fluorocytosine was suspended in 700 ml. of absolute methanol and 8.0 ml. of methanolic barium methylate (0.8N solution) was added. The material went into solution within 15 to 30 minutes. When all had dissolved the solution was allowed to stand in a refrigerator overnight. It was then neutralized with 6.4 ml. of 1N aqueous sulfuric acid. The solution was then evaporated in a rotary evaporator. The product crystallized during the evaporation. It was freed from methylbenzoate by rinsing it with ether and filtering under suction. To free it from barium sulfate the dried material (60°) was dissolved in 170 ml. of water at 70°–80° and filtered through a suction filter at 60°–70°. The clear filtrate was again evaporated in vacuo to crystallization. 200 ml. of isopropanol was added and after standing in a refrigerator for 12 to 24 hours, the 1-β-D-arabinofuranosyl-5-fluorocytosine product was obtained as crystals melting at 237°–238°; $[\alpha]_D^{25.6}$ +160.5, $c = 0.9$ percent in water.

EXAMPLE 6

Preparation of 1-α-D-arabinofuranosyl-5-fluorocytosine

The compound was prepared in complete analogy to the β-anomer as described in Example 5 above using 1-(2',3',5'-tribenzoyl-α-D-arabinosyl)-5-fluorocytosine of melting point 233° as starting material. The 1-α-D-arabinofuranosyl-5-fluorocytosine product crystallized from water-isopropanol in white warts of melting point 221°–222°; $[\alpha]_D^{25}$ −18.083 ($c = 0.9456$ in water).

EXAMPLE 7

Twenty-two g. cytosine were refluxed with 90 ml. hexamethyldisilazane, until, after 4 hours, a homogenous solution had resulted. Upon allowing to cool, the contents of the flask solidified to crystalline material. This material was 2-(trimethylsiloxy)-4-[(trimethyl-silyl)amine]-pyrimidine.

The pyrimidine was dissolved in 500 ml. toluene, 105g. tri-o-benzoylarabinofuranosyl bromide, and 1 g. mercuric acetate were added under stirring and the mixture allowed to stand at 20°–30° for 12 to 16 hours (overnight). It was heated subsequently to 60°–70° for 1 hour in order to complete the reaction and then poured into a mixture of 1 liter 15 percent aqueous sodium acetate solution and 1 liter ethyl acetate in order to neutralize free acids. The organic layer was separated and dried over sodium sulfate. Upon filtration from the drying agent, alcoholic hydrochloric acid was added to the pH of 2–3 in order to precipitate a mixture of the hydrochlorides of α-and β-tribenzoylarabinofuranosyl cytosine hydrochlorides in crystalline form, 88g. melting at 220°–230°.

Separation of the two anomers is effected by crystallization from 880ml. 66 percent aqueous ethyl alcohol from which only one hydrochloride (m.p. 261°–263° dec., the β-anomer), crystallized in a yield of 22–24 g. The α-anomer is obtained by evaporation of the mother liquor in vacuo and crystallization of the residue from absolute ethanol, m.p. 233°–235° dec.

The free β-tribenzoylarabinofuranosyl cytosine was obtained from the hydrochloride by suspending the latter, 19 g., in ethyl acetate 100 ml., shaking the suspension in the aqueous 25 percent ammonia 5–10 ml. The material formed first a clear solution in the ethyl acetate layer from which it however, crystallized rapidly in well-formed prisms, 14 g. (complete crystallization by adding successively ether in small portions). Upon additional recrystallization from alcohol, there was obtained pure β-tribenzoylarabinofuranosyl cytosine, m.p. 206°–207°, 11.5 g.

EXAMPLE 8

β-arabinofuranosyl cytosine was obtained from the tribenzoyl compound in the following manner:

Five g. tribenzoylarabinofuranosyl cytosine were suspended in 100 ml. absolute methanol. 1 ml. methanolic barium methylate solution (1.64 normal) was added. The material went in solution within several minutes. The solution was allowed to stand at 20°–30° for 12–16 hours (overnight) freed from barium by the addition of the calculated amount of sulfuric acid (1.64 ml. 1 normal) and subsequent filtration from barium sulfate. The filtration upon evaporation and slurrying with diethyl ether, in order to remove methylbenzoate, gave β-arabinofuranosyl cytosine as a crystalline material, m.p. 218°–219° and $[\alpha]_D^{25} = 163.98°$ (C = 0.5 percent in water).

I claim:

1. A process for obtaining a pure β-anomer from a mixture containing anomers of the formulas:

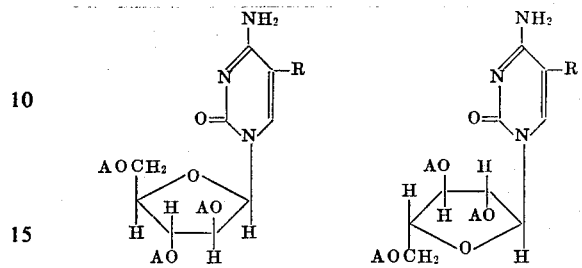

wherein R is hydrogen or fluorine and A is an acyl selected from the group consisting of lower alkanoyl, lower aroyl and aryl lower alkanoyl;
comprising fractionally crystallizing said β-anomer from an inert organic solvent.

2. A β-anomer of the formula:

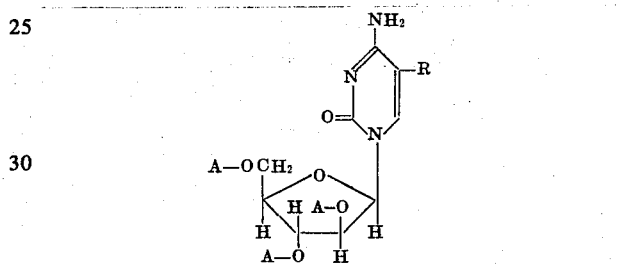

wherein R is hydrogen or fluorine and A is an acyl selected from the group consisting of lower alkanoyl, lower aroyl and aryl lower alkanoyl;
said β-anomer being free of the corresponding α-anomer.

3. The compound of claim 2 wherein said compound is 1-(2′,3′,5′-tri-O-benzoyl-β-arabinofuranosyl)-5-fluorocytosine.

4. The compound of claim 2 wherein said compound is 1-(2′,3′,5′-tri-O-benzoyl-β-D-arabinofuranosyl)-5-fluorocytosine.

5. The compound of claim 2 wherein said compound is 1-(2′,3′,5′-tri-O-benzoyl-β-D-arabinofuranosyl)-cytosine.

* * * * *